United States Patent [19]

van der Meer et al.

[11] Patent Number: 4,857,575

[45] Date of Patent: Aug. 15, 1989

[54] STABILIZED POLYPHENYLENE ETHER-POLYAMIDE COMPOSITIONS

[75] Inventors: Roelof F. van der Meer, Je Halsteren, Netherlands; Roger W. Avakian, Brasschaat, Belgium

[73] Assignee: General Electric Company, Selkirk, N.Y.

[21] Appl. No.: 107,621

[22] Filed: Oct. 9, 1987

[51] Int. Cl.[4] ............................. C08K 5/09; C08K 3/16
[52] U.S. Cl. ..................................... 524/398; 524/399; 524/403; 524/434; 524/435; 524/538
[58] Field of Search ............... 524/398, 399, 538, 403, 524/434, 435

[56] References Cited

U.S. PATENT DOCUMENTS

| | | |
|---|---|---|
| 3,067,168 | 12/1962 | Purdon ................................ 524/399 |
| 3,306,874 | 2/1967 | Hay ...................................... 528/215 |
| 3,306,875 | 2/1967 | Hay ...................................... 528/215 |
| 3,519,595 | 7/1970 | Hermann et al. .................... 524/398 |
| 3,658,705 | 4/1972 | Evers et al. ......................... 524/399 |
| 3,974,235 | 8/1976 | Cooper et al. ...................... 524/434 |
| 4,421,892 | 12/1983 | Kasahara et al. ................... 525/183 |
| 4,543,391 | 9/1985 | Kuribayashi et al. ............... 525/74 |
| 4,600,741 | 7/1986 | Aycock et al. ...................... 524/147 |

*Primary Examiner*—Lewis T. Jacobs
*Attorney, Agent, or Firm*—Hedman, Gibson, Costigan & Hoare

[57] ABSTRACT

Large molded parts made of polyphenylene ether-polyamide resin can be improved with respect to retention of physical properties after thermal aging which is accomplished by the incorporation therein of certain effective metal salts such as CuI, $CuCl_2$, and $Cu(OAc)_2$.

28 Claims, No Drawings

STABILIZED POLYPHENYLENE ETHER-POLYAMIDE COMPOSITIONS

FIELD OF THE INVENTION

Compatibilized polyphenylene ether-polyamide compositions can be stabilized with certain effective metal salts to provide resin compositions which have good retention of impact properties after aging, are more oxidatively stable, and exhibit a surprising improvement in melt stability during processing of the resin.

BACKGROUND OF THE INVENTION

Compatibilized polyphenylene ether-polyamide compositions are thermoplastic blends which combine a number of useful properties from each of the basic components.

Polyphenylene ether resins (PPE) are known to have good thermal properties, impact strength, hydrolytic and dimensional stability, as well as good electrical properties.

The polyamide or nylon resins offer good chemical o resistance, process ability and impact strength.

PPE-polyamide blends have found great utility in thermoplastic applications which require a combination of these properties. For example, PPE-Polyamide compositions can provide automotive body panels which are readily injection moldable on typical molding equipment. These compositions exhibit the good impact strength and ductility necessary for such large automotive parts and can withstand high oven-aging temperatures when body panels are painted on-line in existing automotive paint ovens.

It has now been discovered that PPE-polyamide compositions can be effectively stabilized with certain metal salts such as metal halides which will be described in detail below. Such stabilized compositions exhibit several improved properties including retention of impact strength properties after heat aging, resistance to oxidative degradation and, notably, an enhancement in melt stability.

It is especially with regard to these last two mentioned properties that the PPE-polyamide compositions of the present invention differ from stabilized polyphenylene ether resins or polyamide resins. The present PPE-polyamide compositions are stable during the high temperature, molten conditions of modern extrusion and molding processes, and resist the tendency toward degradation of the resin often encountered in such processes. This property is of particular significance when it is desired to provide stable resins for the large part thermoplastic applications mentioned above such as automotive body panels. For example, cuprous iodide will improve the chemical stability of the PPE-polyamide blend at melt processing temperatures. This is a critical feature since the material must give good mechanical properties under a wide variety of melt processing conditions. Improved stability in the melt allows higher processing temperatures to be employed. A direct result of this is improved melt flow, which allows the use of less costly equipment for molding and facilitates the fabrication of larger parts.

SUMMARY OF THE INVENTION

Stabilized PPE-polyamide compositions are based upon compatibilized PPE-polyamide resins. These resins are chemically or physically compatibilized thermoplastic blends based upon polyphenylene ether resins and polyamide resins. The exact mechanism for compatibilizing these two normally incompatible resins is not certain but it may be accomplished in a number of ways.

Polyphenylene ethers and polyamide resins tend to be quite incompatible when merely blended as physical admixtures. Incompatibility refers in general to a deterioration of physical properties (such as impact strength) as compared to the base resins alone. Often, blends of these relatively incompatible plastics exhibit a tendency to delaminate during processing or afterwards in fabricated parts.

Attempts to overcome this tendency toward incompatibility have been by various means. Compatible PPE-polyamide blends have been made by physical dispersion of one component in the other as described in U.S. Pat. No. 3,379,792 (Finholt) where the polyamide component is present in amounts only up to about 25 weight percent.

Improved PPE-polyamide resin products can be provided by chemically compatibilizing the polyphenylene ether and polyamide resins by a variety of methods. Any of several mechanisms may be involved in providing these compatibilized PPE-polyamide compositions.

In some instances, graft copolymers may form between the PPE and the polyamide. In other instances the compatibilizing agent may merely facilitate a fine dispersion of one resin component in the other. Fine uniform dispersion of one resinous component (such as the PPE) in a continuous phase of the other component (such as the nylon) is often preferred since this typically provides PPE-polyamide products having desirable properties such as high impact strength as well as good chemical resistance. As noted, a fine uniform dispersion can sometimes be achieved by applying sufficient physical mixing, however, chemical compatibilization is usually preferred.

Among the noteworthy methods for providing compatibilized PPE-polyamide products are those described in PCT WO 85/05372 (Gallucci et al) which utilizes a polydicarboxylic acid as the compatibilizing agent. Another method is described in U.S. Pat. No. 4,600,741, and related patent U.S. Pat. No. 4,642,358 (Aycock, et al.) which uses as the compatibilizing agent a polyphenylene ether which has been modified with certain acyl-functional compounds such as trimellitic anhydride acid chloride. Other means of compatibilization of PPE-polyamide compositions are in U.S. Pat. Nos. 4,315,086 (Ueno, et al.), 4,339,376 (Kasahara, et al.) and 4,659,760 (Van der Meer) and others.

The means for effecting the compatibilization of the PPE-polyamide resin is not critical to the practice of the present invention which provides thermally and oxidatively stabilized versions of these resins. For purposes of the present specification, compatibilized PPE-polyamide compositions are those provided by any of the above discussed methods as well as others, without limitation.

The stabilization provided by the present invention is accomplished by incorporation of certain metal salts in the formulations of the PPE-polyamide resin.

In general the metal salts will have the general formula $$y+z-$$

$$M_n X \frac{n \cdot y}{z}$$

where M represents a metal ion such as copper, nickel, tin, cerium etc. X represents a negatively charged ion, lo preferably a halide such as Cl, Br, F, I; or a carboxylate such as stearate or acetate; n represents an integer of 1 to about 6, y is an integer representing the positive ionic charge of the metal ion whereas z is an integer representing the negative ionic charge of X; the number of negative ions present in the molecule will be determined by the product of n and y divided by z (i.e. n·y/z).

Among the suitable metal salts suitable for use in the present invention are $CuCl_2$, CuI, copper acetate and cerium stearate, all of which are commercially available from a variety of sources. Of these, CuI is preferred. CuI may be obtained commercially or may be prepared by precipitation and isolation of the salt by reaction of copper metal and HI.

The metal halide salt will be utilized in amounts necessary to provide effective stabilization. Ordinarily at least 0.001 parts by weight of the metal halide will be necessary per 100 parts by weight of the PPE-polyamide base resin. More than about 0.5 parts metal halide per 100 parts PPE-polyamide resin will not typically afford sufficient additional benefit to justify its use at such levels. It has been found that metal salts were effective at levels as low as 200 ppm for stabilization of PPE-polyamide blends of the present invention. It is also possible to provide in situ generation of a metal halide by utilizing a metal carboyxlate such as cerium stearate in the presence of a halide source such as KI. 0 Some commercial nylon products contain metal salts, particularly Copper salts, which may be effective in the practice of the present invention. It is possible to utilize effective quantities of these commercial polyamides (as described in the example) to achieve the stabilized PPE-polyamide composition of the present invention.

Polyphenylene ether resins are described in many patents including U.S. Pat. Nos. 3,306,874 and 3,306,875 of Allan S. Hay. Polyphenylene ethers are generally formed by the reaction of a monovalent phenol with oxygen in the presence of a copper-amine complex catalyst. Polyphenylene ether resins may be from phenol or substituted phenol compounds. Of the latter, 2,6-dimethyl phenol and 2,3,6-trimethyl phenol are preferred. Thus, a particularly preferred polyphenylene ether resin would be poly(2,6-dimethyl-1,4-phenylene ether). Suitable polyphenylene ethers will typically have intrinsic viscosities ranging from 0.1 to 0.8 dl/g ( and preferably 0.4 to 0.6 dl/g) as measured in chloroform at 25° C.

Polyamides are condensation polymers formed from diamines and dibasic acids and the self-condensation of amino acids as well as those formed by the polymerization of lactams.

Typical examples of the polyamides or nylons, as these are often called, include for example polyamides 6, 6/6, 11,12,3/6, 4/6, 6/10, 6/12 and 12/12 as well as polyamides resulting from terephthalic acid and trimethyl hexamethylene diamine, polyamides resulting from adipic acid and meta xylylenediamines, polyamides resulting from adipic acid, azelaic acid and 2,2-bis(p-aminocyclohexyl)propane and polyamides resulting from terephthalic acid and 4,4'-diamino-dicyclohexylmethane. Preferred polyamides are the polyamides 6, 6/6, 4/6, 11 and 12, most preferably polyamide 6/6 or polyamide 6, and the so-called amorphous polyamides.

Compatible mixtures of the foregoing components will generally be comprised of 5 to 95 weight percent of the polyphenylene ether resin and correspondingly 95 to 5 weight percent of the polyamide component based upon the weight of the two resins taken together. For an optimum balance of properties such as impact strength, heat distortion, and chemical resistance, such compositions will preferably contain 25 to 75 weight percent of the polyphenylene ether resin and 75 to 25 weight percent of the polyamide.

Rubbery impact modifiers are generally used in compositions of the present invention. Natural or synthetic rubber materials such as those based on butadiene or isoprene as well as copolymers such as EPDM rubber may be utilized. Particularly preferred are the di- and tri- block copolymers having styrenic and diene components including those which have been partially hydrogenated to reduce the unsaturation in the diene component. Suitable block copolymers include styrene-butadiene-styrene rubber (SBS), styrene-ethylene butylene-styrene rubber (SEBS), and styrene-ethylene propylene rubber (SEP). Also suitable as an impact modifier would be those of the type having a two phase interpolymer structure as described in U.S. Pat. No. 4,681,915. Preferred modifiers of this type have a cross-linked acrylate core and an interpenetrating, cross-linked styrenic shell.

Optional additives include flame retardants, pigments, antioxidants, processing aids and like additives in effective amounts.

Each of the foregoing constituent ingredients can be compounded to provide composites of the invention by conventional means such as by blending and extrusion. Twin screw extruders having multiple addition ports are often preferred as this allows initial feeding of the polyphenylene ether resins, the rubbery impact modifier, the compatibilizing agent and the metal halide stabilizer under conditions which allow optimum temperature and shear rates. Downstream addition of the polyamide accomplishes adequate mixing and dispersion yet minimizes harsh conditions. The extrudate of this process can be water quenched and pelletized and is thereafter suitable for use in thermoplastic molding or extrusion applications.

Each of the aforementioned patents and applications is hereby incorporated by reference.

The following examples illustrate several means for practicing the invention.

EXAMPLES 1-7

Copper iodide is seen to be an effective stabilizer for PPE-polyamide compositions based on nylon-6,6 and impact modified with an unsaturated styrene-butadiene-styrene rubber. When samples are subjected to oven aging at temperatures in the range of 350°–425° F., copper iodide significantly improves retention of Dynatup Impact as seen in Table 1.

Each of the blends were prepared by melt blending 49 parts poly(2,6-diethyl-14-phenylene ethers), 41 parts nylon-6,6, 10 parts SBS triblock copolymer elastomer (Shell Kraton D1102), and 0.7 parts citric acid monohydrate. Irganox 1010 and Irganox 1076 are conventional stabilizers available from Ciba-Geigy. Additives are indicated in parts by weight except where percents are specified. The mixtures were melt blended on a 30 mm Werner-Pfliederer twin screw extruder at 550° F. The pellets were molded on a 3 oz. Newbury molding machine at 550° F. into a 150° F. mold. ASTM parts were prepared and oven aged in an air circulation oven for the time and temperature indicated in the table. Dynatup Impact plaques were cooled to room temperature and stored at least 16 hours before testing. The designation 350-2 refers to 2 hours oven aging at 350° F.

(Notched Izod and Dynatup Impact) are compared after molding at temperatures of 550, 590 and 620° F. This experiment was carried out with blends prepared as described earlier. In a second series, similar blends were prepared using a saturated isoprene-styrene diblock thermoplastic rubber (Shell Kraton G1702). All blends contained 0.1% KI and 0.3% Irganox 1076.

In addition to the actual Dynatup Impact values in

TABLE 1

| | | Oven Aging Data (degrees F. - hrs) | | | | |
|---|---|---|---|---|---|---|
| Example | Formulation | RT DYNATUP | 350-2 | 350-4 | 375-2 | 375-4 |
| A* | Control, no additives | 42 ft lbs | 45 | 28 | 37 | 16 |
| 1 | .3 parts Irganox 1076, .02 CuCl2 | 42 | 39 | 33 | 41 | 39 |
| 2 | 0.2 Cu(OAc)2, .02 CuCl2 | 47 | 45 | — | 43 | 37 |
| 3 | .5 Irganox 1010, .05 CuI | 43 | 43 | 38 | 43 | 32 |
| 4 | .05 CuI alone | 42 | 46 | 38 | 37 | 41 |
| 5 | .02 CuI, .5 Irganox 1010 | 42 | 47 | 41 | 46 | 39 |
| 6 | Prestabilized Nylon[a] | 48 | 43 | 37 | 44 | 39 |
| 7 | .4 Aq. KI, .3 Irganox 1076, .05 CuI | 41 | 44 | 44 | 45 | 41 |

*Comparative Example
[a]Monsanto Vydyne 21 HS, Polyamide 6,6

EXAMPLES 8-9

The examples in Table 1 above demonstrate that copper salts significantly improve the retention of Dynatup Impact in samples aged in air at 350° and 375° F.

Table 2 below compares similar blends at temperatures as high as 425° F. These results further demonstrate the use of CuI in stabilization of PPE/Polyamide blends.

TABLE 2

| Example | Formulation | RT Dynatup | 400-1 | 400-2 | 425-1 | 425-2 |
|---|---|---|---|---|---|---|
| B* | .3% Irganox 1076, .1% KI | 39 | 39 | 20 | 15 | 11 |
| 8 | .02% CuI | 43 | 41 | 41 | 38 | 36 |
| 9 | .05% CuI | 46 | 43 | 32 | 44 | 23 |

*Comparative Example

EXAMPLE

Stabilization can be demonstrated by evaluating the physical properties obtained after molding at a series of melt temperatures. An improved product will show more uniform mechanical properties such as impact resistance. In Table 3 below, physical properties (Notched Izod and Dynatup Impact) are compared after molding at temperatures of 550, 590 and 620° F. inch-lbs, the ductility is reported as D for ductile or B for brittle or some combination in the five plaques tested. With the KD1102 blends, a more dramatic retention in impact strength and ductility is observed in the Dynatup test, whereas using KG1702, the retention in dynatup impact strength is less striking but significant improvements in Notched Izod retention are seen.

TABLE 3

| | | | Notched Izod | | | Dynatup Impact | | |
|---|---|---|---|---|---|---|---|---|
| Example | Rubber | CuI Level | 550 | 590 | 620 | 550 | 590 | 620 |
| C* | KD1102 | 0 | 4.1 | 4.2 | 3.4 | 498D | 430D/B | 365B |
| 10 | KD1102 | 500 ppm | 4.5 | 4.1 | 3.5 | 551D | 530D | 474D |
| D* | KG1702 | 0 | 9.6 | 4.4 | 3.2 | 518D | 443B/D | 502B |
| 11 | KG1702 | 500 ppm | 9.6 | 7.8 | 7.5 | 544D | 476B/D | 490B |

*Comparative Examples

EXAMPLES 12-13

Additional formulations in accordance with the invention were prepared. The following components were compounded on a twin screw extruder, as above, parts given are by weight:

| Component | Parts |
|---|---|
| polyphenylene ether resin[a] | 44 |
| polyamide 6,6[b] | 41 |
| citric acid (anhydrous) | 0.7 |
| rubbery impact modifier[c] | 15 |
| Irganox 1076 antioxidant | 0.3 |
| CuI Stabilizer | See Table |

Notes:
[a]poly(2,6-dimethyl-1,4-phenylene ether) having an intrinsic viscosity of 0.46 dl/gm in chloroform at 25° C.
[b]polyamide 6,6
[c]Kraton GX 1701, Shell Chemical saturated diblock copolymer (SEP type)

TABLE 4

| Stabilizer | | Control | EX 12 | EX 13 |
|---|---|---|---|---|
| CuI (pbw) | | none | 0.028 | 0.056 |
| Properties | | | | |
| Notched Izod Impact | | | | |
| Room Temperature | J/m | 487.5 | 502.5 | 535 |
| −30° C. | J/m | 230 | 225 | 225 |

TABLE 4-continued

| Stabilizer | | Control | EX 12 | EX 13 |
|---|---|---|---|---|
| N. Izod After Heat Aging | | | | |
| 1 hour at 180° C. | | | | |
| Room temperature | J/m | 330 | 452.5 | 470 |
| −30° C. | J/m | 87.5 | 190 | 197.5 |
| Charpy Impact | | | | |
| Room Temperature | kJ/m$^2$ | 27.8 | 29.1 | 29.5 |
| −30° C. | kJ/m$^2$ | 21.6 | 20.8 | 22.7 |
| Charpy Impact After | | | | |
| Heat Aging | | | | |
| 1 hour at 180° C. | | | | |
| Room Temperature | kJ/m$^2$ | 15.9 | 23.9 | 24.3 |
| −30° C. | kJ/m$^2$ | 8.0 | 19.7 | 20.2 |
| Oxygen Uptake | | | | |
| 88 hours at 124° C. | ml/g | 15 | 2 | 2 |

We claim:

1. A thermoplastic composition having improved retention of physical properties upon thermal aging comprising:
   a. a compatibilized polyphenylene ether-polyamide resin blend comprised of, approximately 5 to 95 parts by weight polyphenylene ether resin, and 95 to 5 parts by weight polyamide resin; and
   b. approximately 0.001 to 0.5 parts by weight per 100 parts of resin composition a. of a metal salt of the formula $$M_n X \frac{n \cdot y}{z}^{y+z-}$$

where M represents a metal ion selected from the group consisting of copper, nickel, tin and cerium, X is an ion radical selected from the group consisting of halide ion and carboxylate ion, y is an integer representing the positive ionic charge of M and z is an integer representing the negative ionic charge of X.

2. A composition as in claim 1 wherein said halide ion is selected from the group consisting of Cl, Br, F, and I ions and said carboxylate ion is selected from the group consisting of stearate and acetate ions.

3. A composition as in claim 1 wherein said metal salt is selected from the group consisting of CuI, CuCl$_2$, copper acetate and cerium stearate.

4. A composition as in claim 1 wherein said polyphenylene ether-polyamide resin blend contains a compatibilizing amount of a chemical compatibilizing agent.

5. A composition as in claim 4 wherein said chemical compatibilizing agent is a polycarboxylic acid.

6. A composition as in claim 1 wherein said polyphenylene ether resin is comprised principally of 2,6-dimethyl phenol units and 2,3,6-trimethyl phenol units.

7. A composition as in claim 6 wherein said polyphenylene ether is poly 2,6-dimethyl-1,4-phenylene ether) having an intrinsic viscosity of, approximately 0.1 to 0.8 dl/g as measured in chloroform at 25° C.

8. A composition as in claim 1 wherein said polyamide is one or more polyamide resins selected from the group consisting of nylon 6, nylon 6,6, nylon 4,6, nylon 11, and nylon 12.

9. A composition as in claim 1, further comprising approximately 1 to 30 parts by weight of at least one rubbery impact modifier per 100 parts of said polyphenylene ether-polyamide resin blend.

10. A composition as in claim 1 wherein said metal salt is present in an amount of at least about 200 ppm.

11. A thermoplastic composition comprising:
    (a) a compatibilized polyphenylene etherpolyamide resin blend; and
    (b) at least one metal salt of the formula $$M_n X \frac{n \cdot y}{z}^{y+z-}$$

wherein M represents a metal ion, but not potassium alone, X represents a negatively charged ion, n represents the number of metal ions in the metal, y is an integer representing the positive ionic charge of M and z is an integer representing the negative ionic charge of X and wherein the metal salt is present in an amount sufficient to provide effective stabilization of component (a).

12. A composition according to claim 11 wherein the polyphenylene ether of component (a) has an intrinsic viscosity of from about 0.1 to about 0.8.

13. A composition according to claim 12 wherein the polyphenylene ether of component (a) has an intrinsic viscosity of from about 0.4 to about 0.6.

14. A composition according to claim 11 wherein the polyamide is selected from the group consisting of polyamide 6, polyamide 3/6, polyamide 4/6, polyamide 6/6, polyamide 6/10, polyamide 6/12, polyamide 11, polyamide 12, polyamide 12/12, polyamide produced from terephthalic acid and trimethyl hexamethylene diamine and mixtures of more than one of the foregoing.

15. A composition according to claim 11 wherein, in component (a), the polyphenylene ether is present in an amount of from about 5 to about 95 parts by weight and the polyamide is present in an amount of from about 95 to about 5 parts by weight of the polyphenylene ether-polyamide resin blend.

16. A composition according to claim 11 wherein, in component (a), the polyphenylene ether is present in an amount of from about 25 to about 75 parts by weight and the polyamide is present in an amount of from about 75 to about 25 parts by weight of the polyphenylene ether-polyamide resin blend.

17. A composition according to claim 11 wherein component (b) is present in an amount of at least about 0.001 parts by weight per 100 parts by weight of component (a).

18. A composition according to claim 11 wherein component (b) is present in an amount of at least about 200 ppm per 100 parts by weight of component (a).

19. A composition according to claim 11 wherein n is from 1 to 6.

20. A composition according to claim 11 wherein M represents a metal ion selected from the group consisting of copper, nickel, tin and cerium.

21. A composition according to claim 11 wherein X represents a radical selected from the group consisting of halide ions and carboxylate ions.

22. A composition according to claim 21 wherein X is selected from the group consisting of fluorine, chlorine, bromine, iodine, stearate and acetate.

23. A composition according to claim 11 further comprising at least one impact modifier for said composition.

24. A composition according to claim 23 wherein said impact modifier comprises approximately 1 to 30 parts by weight per 100 parts by weight of component (a).

25. A composition according to claim 23 wherein said at least one rubber impact modifier is selected from the group consisting of diblock and triblock copolymers comprised of styrene resin and diene monomer.

26. A composition according to claim 25 wherein said copolymers are selected from the group consisting of styrene-ethylene/butylene-styrene, styrene-butadiene styrene, styrene-ethylene/propylene copolymers and mixtures of more than one of the foregoing.

27. A composition according to claim 23 wherein component (a) is a compatibilized polyphenylene ether-polyamide blend comprised of 49 parts polyphenylene ether, 41 parts polyamide and 0.7 parts of a compatibilizer comprised of citric acid monohydrate, component (b) is selected from the group consisting of cupric chloride, copper acetate, cuprous iodide and mixtures of more than one of the foregoing and at least one impact modifier is comprised of 10 parts by weight of a styrene-butadiene triblock copolymer.

28. A composition according to claim 27 wherein component (b) is present in an amount of from about 0.02 parts by weight to about 0.2 parts by weight.

* * * * *